United States Patent [19]  [11] 3,754,627
Hotchkiss  [45] Aug. 28, 1973

[54] SEGMENTED DISC ELEMENT
[75] Inventor: Marvin E. Hotchkiss, Troy, Ohio
[73] Assignee: The B.F. Goodrich Company, New York, N.Y.
[22] Filed: June 5, 1972
[21] Appl. No.: 259,981

[52] U.S. Cl. ...... 192/107 R, 188/73.2, 188/218 XL
[51] Int. Cl. ............................................. F16d 13/64
[58] Field of Search .................... 188/218 XL, 73.2; 192/107 R

[56] References Cited
UNITED STATES PATENTS
3,426,871  2/1969  Harnish............................ 192/107 R
3,613,851  10/1971  Ely et al. .................... 188/218 XL X Primary Examiner—George E. A. Halvosa
Attorney—John D. Haney et al.

[57] ABSTRACT

A segmented friction member assembly for a disc-type brake or clutch in which segmental facing members overlap heat-absorbing segments keyed to the rotating or nonrotating structure at a configured peripheral edge. Torque is transmitted from the facing members to the segments by interlocking members extending between opposing facing members and engaging recesses in the side edges of the heat-absorbing segments. Slanted surfaces of the recesses direct the components of the torque force being transmitted in predetermined directions so as to minimize the forces on the heat-absorbing segments tending to rotate the segments in the friction member assembly.

8 Claims, 4 Drawing Figures

Patented Aug. 28, 1973 3,754,627

SEGMENTED DISC ELEMENT

BACKGROUND OF THE INVENTION

This invention relates to disc-type brakes or clutches and particularly to annular friction disc members which engage other friction disc members during operation of the brake or clutch. The friction disc members may have surfaces which engage friction surfaces on other disc members and these surfaces may carry friction lining material. In high energy aircraft type brakes where great quantities of heat must be absorbed, plates of heat-absorbing material such as beryllium have been positioned between facing members which support the plates and provide strength where needed in the annular friction disc members.

The facing members and plates of heat-absorbing material have been segmented to reduce thermal warpage and cracking due to high heat generation. In segmented friction disc members used heretofore, the torque has been transmitted from the facing members to the plates of heat-absorbing material through cylindrical torque buttons mounted on the facing members and seated in semicircular recesses in the side edges of the plates of heat-absorbing material. This torque force was opposed by the force exerted on the plates of heat-absorbing material by the brake or clutch parts in engagement with the peripheral edges of the plates. It has been found that with this construction the torque forces tend to rotate the plates of heat-absorbing material in the friction disc assembly and the facing members must withstand this rotating force to hold the assembly together. As a result, the facing members have been of a larger, heavier construction than would be necessary if they did not have to withstand the rotating forces. This is a significant problem especially in aircraft brakes where the weight and space limitations are so critical.

SUMMARY OF THE INVENTION

According to this invention, the tangential force transmitted to the heat-absorbing plates through the torque buttons is applied to the plates in such a manner that a reduction in the forces tending to rotate the plates is obtained. The recesses in the side edges of the heat-absorbing plate have slanted surfaces for engagement with the cylindrical torque buttons for dividing the torque forces into two components. One of the components is in a direction towards the peripheral edge where torque forces are resisted by engagement with brake and clutch torque transmitting parts. The other of the components is in the radially outward direction and can be resisted by the rivets fastening the facing plates to an adjoining heat-absorbing plate.

One of the sides of each of the recesses is relieved so that the torque buttons do not engage the surfaces on that side and thereby minimize the forces on the plates tending to cause rotation. The segmented annular assembly is also held together by rivets connecting adjoining facing members and the underlying plates at the configured periphery where the plates are engaged by the torque transmitting parts of the brake or clutch. The stress on these rivets is reduced by the improved configuration of the recesses in the side edges of the plates. With the construction of the invention, each of the facing members overlaps two of the heat-absorbing plates and the rivets in each facing member extend through two of the heat absorbing plates providing a unitary annular structure.

The accompanying drawings show one preferred form made in accordance with and embodying this invention and which is representative of how this invention may be practiced.

DETAILED DESCRIPTION

Figure 1:
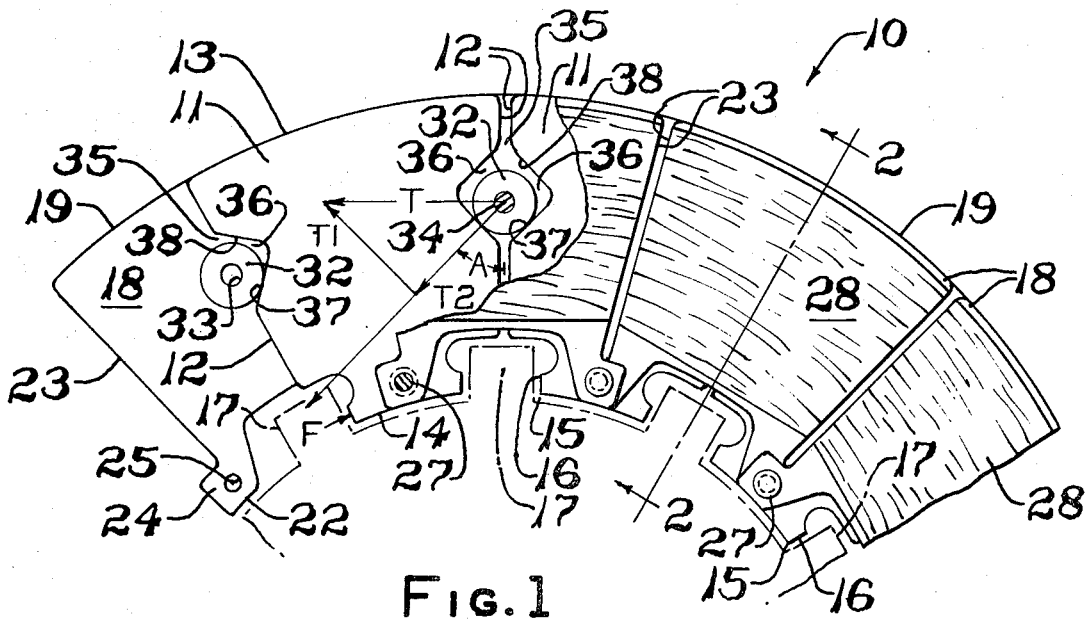
FIG. 1 is a side elevation of a part of an annular disc assembly (shown in solid lines), certain parts being broken away, and illustrated in torque driving engagement with a related part which, in this example, may be a splined torque tube, the sides of which are represented by the chain-dotted lines.
Figures 3, 4:
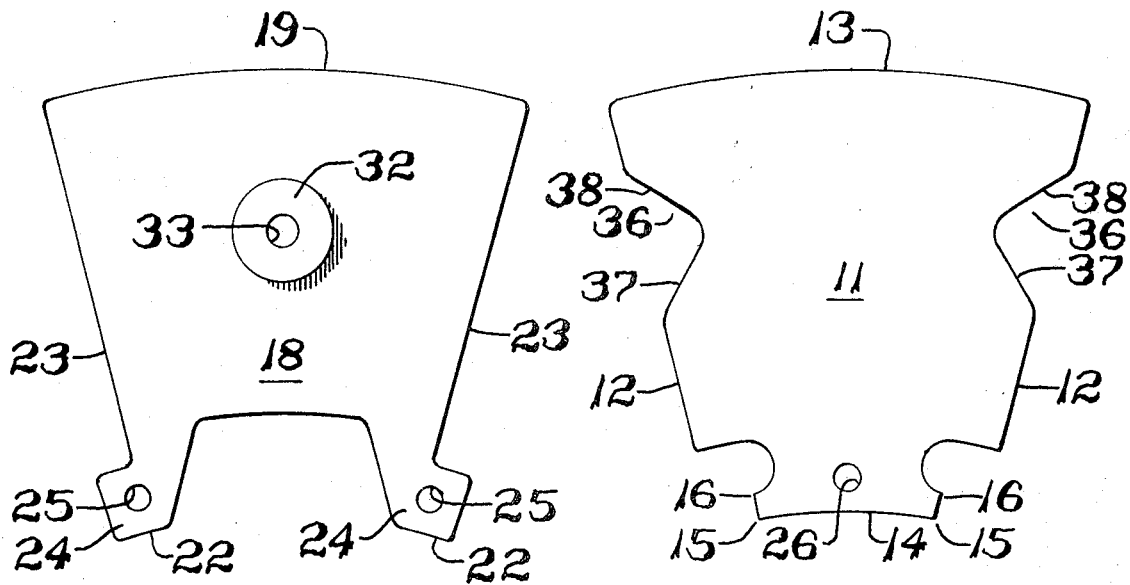
FIG. 3 is a side elevation of one of the facing members showing the inside face which abuts the heat-absorbing segments.
FIG. 4 is a side elevation of one of the heat-absorbing segments showing the recesses in the side edges.

Referring to FIG. 1, an annular friction member 10 is shown which is made up of heat-absorbing, load-bearing segments 11 each of which has an arcuate sector-shape, as shown more clearly in FIG. 4, with side edges 12 in opposing relationship to the adjoining segments. Each of the segments 11 has an outer peripheral edge 13 and an inner peripheral edge 14 which may be configured with the corners 15 being offset circumferentially from the side edges 12 to form indentations 16 at the corners. The heat-absorbing segments 11 may have a thickness of around one-half inch and may be of beryllium or other high heat-absorbing material.

As shown in FIG. 1, the indentations 16 of adjoining segments 11 provide slots for receiving interfitting splines 17 of an associated torque tube or other brake or clutch part which is represented in chain-dotted lines.

Overlapping the outer faces of the heat-absorbing segments 11 are arcuate wear-resisting segmental facing members 18 arranged in a series on one side of the annulus of segments and in another series on the opposite side of the segments. As shown more clearly in FIG. 3, each of the facing members 18 has an outer peripheral edge 19 and an inner peripheral edge 22 which may be cut out to provide clearance for the splines 17 of the torque tube. The facing members 18 have radially extending side edges 23 which are in opposing relationship to the side edges of adjacent facing members to provide annular enclosures on opposite sides of the annulus of segments 11. The side edges 23 of the facing members 18 are arcuately offset from the side edges 12 of the heat-absorbing segments 11 so that when the facing members and segments are fastened together they form a unitary annular structure.

The facing members 18 have circumferentially extending ears 24 at the inner peripheral edge 22 which extend arcuately from the side edges 23 in overlapping relationship with the ears of adjoining facing members. The overlapping ears 24 have holes 25 is aligned relationship with holes 26 located between the indentations 16 of the heat-absorbing segments 11 for receiving rivets 27 extending from the series of facing members 18 on one side of the segments through the segments and into engagement with the series of facing members enclosing the opposite side of the segments. The rivets 27 not only retain the segments 11 between the facing members 18 but also connect the adjoining facing members through the ears 24 at circumferentially spaced-apart positions around the annular friction member 10. It can be seen that there are two ears 24 on each facing member 18 and each of these ears is fastened by rivets 27 to a different adjoining heat-absorbing segment 11 whereby the adjoining segments are held together by the facing members forming a continuous articulated annular enclosure for the heat-absorbing segments.

Figure 2:
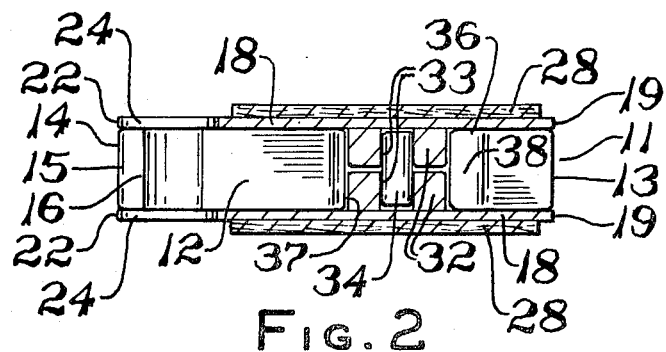
FIG. 2 is a sectional view taken along the plane of line 2—2 of FIG. 1.

A friction lining material 28 may be adhered to the facing members 18 on the outer surface thereof, as shown in FIGS. 1 and 2, and may be of the type described and set forth in U.S. Pat. No. 2,966,737 of R. E. Spokes et al. On the inner surface of each of the facing members 18, a cylindrical plug or torque button 32 may be resistant-welded to the facing member and has a central hole 33 in alignment with a corresponding hole in a torque button mounted on an opposing facing member. A pin 34 which may have a serrated surface connects the opposing torque buttons 32 through a press-fit connection in the holes 33.

The torque buttons 32 are disposed in openings 35 between the side edges 12 of the heat-absorbing segments 11 formed by recesses 36 in the opposing side edges. The cylindrical torque buttons 32 engage a radially inner force-transmitting surface 37 of each of the recesses 36 for transmitting torque from the facing members 18 to the heat-absorbing segments 11. The force-transmitting surface 37 is slanted away from the inner peripheral edges 14 and 19 of the heat-absorbing segments 11 and facing members 18 and extends in a generally tangential direction from the cylindrical torque buttons 32 and radially outward therefrom. As shown in FIG. 1, the recesses 36 have a radial dimension greater than the radius of the torque buttons 32 so that the radially outer surface of the torque buttons do not engage radially outer surfaces 38 of the recesses. It is understood that the facing members 18 and the other parts of the annular friction member 10 except for the heat-absorbing segments 11 may be of steel or other high strength, wear-resisting material.

In operation, the annular friction member 10 is slidable axially along the splines 17 of the torque tube into engagement with other annular disc type friction members with the friction lining material 28 engaging other friction members producing a tangential force T exerted by one of the facing members 18 on one of the heat-absorbing segments 11 as illustrated in FIG. 1. The force T is the total tangential force on one segment generated by the friction over the total rubbing surface of the friction lining material 28. This force T acts through the torque button 32 and is opposed by a force F exerted by one of the splines 17 on the corner 15 of the segment 11 as shown in FIG. 1. The total tangential force T is divided into two force components T1 and T2 as shown in FIG 1. Force component T2 is perpendicular to the slanted force-transmitting surface 37 and is directed radially inward toward the opposing force F at the inner peripheral edge 19 of the segments 11. The other force component T1 is resisted by one of the facing member rivets 27 at the point B shown on FIG. 1. The radially outer surface of the recess 36 is spaced from the torque button 32 so that there will be no force transmitted in that direction.

The slanted force-transmitting surface 37 may be at different angles with different sizes and shapes of segments 11. It is desirable that the direction of the force T2 be at an angle A from the radial direction, as indicated in FIG. 1, such that the force is directed towards the point of application of the opposing force F and preferably a few degrees radially outward thereof.

With this construction, the total tangential force T is redirected into forces which will reduce the tendency to rotate the segments 11 in the annular friction member structure and thereby reduce the stresses on the facing members 18. By reducing the stresses on the facing members 18, they may be lighter and of less thickness providing more room for the heat-absorbing segments 11 and reducing the weight of the brake assembly.

I claim:

1. A friction member for a brake or clutch comprising:
   a. heat-absorbing, load-bearing segments each with two side edges and outer and an inner peripheral edges, one of said peripheral edges being configured for receiving torque loading from torque-transmitting elements of an associated brake or clutch part, and the segments being assembled with their side edges adjoining to form an annulus;
   b. series of wear-resisting segmental facing members arranged with side edges adjoining to define an annular enclosure on the opposite sides of said annular assembly of the heat-absorbing segments to cover such opposing sides and frictionally engage other brake or clutch parts;
   c. the side edges of the facing members in each series thereof being arcuately offset from the corresponding underlying side edges of said heat-absorbing segments so that each facing member of its respective series overlaps the adjoining side edges of two underlying heat-absorbing segments;
   d. the side edges of the adjoining heat-absorbing segments having opposing recesses providing openings at the side edges;
   e. fastening means extending from each facing member of the series on one side of said segments to and into engagement with a corresponding facing member of the series on the opposite side of said heat-absorbing segments connecting said facing members and said segments;
   f. at least some of said fastening means being located at said openings at the side edges and extending through said openings for transmitting torque between said segments and said facing members;
   g. said recesses in the side edges having force-transmitting surfaces for engagement with said fastening means, said surfaces being on the same side and slanted away from the configured peripheral edge to provide a torque force component in the direction of the configured peripheral edge to minimize the forces tending to rotate segments in said friction member.

2. A friction member according to claim 1 wherein said fastening means at said recesses in the side edges comprise cylindrical torque buttons mounted on the inner faces of said opposing facing members and connected by pin members and said torque buttons being disposed in said openings with said force-transmitting surfaces extending tangentially to said cylindrical torque buttons.

3. A friction member according to claim 1 wherein the configured peripheral edges are disposed at the radially inner periphery of said segments and said force-transmitting surfaces of said recesses in the side edges are slanted radially outward whereby a first torque force component is directed radially inward in a direction opposite to the direction of the force exerted by said associated brake or clutch part on said segment.

4. A friction member according to claim 1 wherein at least some of said fastening means are located at the configured peripheral edge and extend through said segments for connecting the adjoining segments and facing members at circumferentially spaced-apart positions around the friction member.

5. A friction member according to claim 4 wherein each of said facing members has fastening means extending through at least two of said underlying heat-absorbing segments at the configured peripheral edge.

6. A friction member according to claim 4 wherein the adjoining facing members have overlapping portions at the configured peripheral edge and said fastening means located at the configured peripheral edge extend through said overlapping portions and through said underlying segments to provide a unitary friction member assembly.

7. A friction member according to claim 6 wherein the peripheral corners of said segments at the configured peripheral edge are offset to receive splines of an associated brake or clutch part in torque transmitting engagement therewith.

8. A friction member according to claim 7 wherein said fastening means at the configured peripheral edge extends through underlying heat-absorbing segments between the offset peripheral corners of said segments whereby a second torque force component directed away from the configured peripheral edge is opposed by said fastening means connected to an adjoining segment.

* * * * *